United States Patent [19]

Takaragi et al.

[11] Patent Number: 5,018,196
[45] Date of Patent: May 21, 1991

[54] METHOD FOR ELECTRONIC TRANSACTION WITH DIGITAL SIGNATURE

[75] Inventors: Kazuo Takaragi, Ebina; Ryoichi Sasaki, Fujisawa, both of Japan

[73] Assignee: Hitachi, Ltd., Tokyo, Japan

[21] Appl. No.: 375,828

[22] Filed: Jul. 5, 1989

Related U.S. Application Data

[63] Continuation-in-part of Ser. No. 180,050, Apr. 11, 1988, Pat. No. 4,885,777, which is a continuation of Ser. No. 897,861, Aug. 19, 1986, abandoned.

[30] Foreign Application Priority Data

Dec. 23, 1988 [JP] Japan .................... 63-323295

[51] Int. Cl.$^5$ .............................................. H04K 9/00
[52] U.S. Cl. ........................................ 380/30; 380/23; 380/25
[58] Field of Search ...................... 380/23, 24, 25, 30, 380/49, 50

[56] References Cited

U.S. PATENT DOCUMENTS

| | | | |
|---|---|---|---|
| 4,658,093 | 4/1987 | Hellman | 380/30 X |
| 4,759,063 | 7/1988 | Chaum | 380/30 |
| 4,853,961 | 8/1989 | Pastor | 380/30 |
| 4,868,877 | 9/1989 | Fischer | 380/30 |
| 4,881,264 | 11/1989 | Merkle | 380/25 |
| 4,885,777 | 12/1989 | Takaragi et al. | 380/30 |

OTHER PUBLICATIONS

"The Use of Public Key Cryptography for Signing Checks", Proceeding of Crypto 82, Advances in Cryptoloty, Longpre, Aug. 23-25, 1982, U.S.A., pp. 191-192.
Takaragi et al., "Authentication Method for Electronic Contracts with IC Card Key Management", The Transactions of Electrical Engineers of Japan C, vol. 107-C, No. 1, Jan. 1987, pp. 46-53.
Ikeno et al., "Modern Cryptology", The Transactions of the Institute of Electronics and Communication Engineers of Japan, Sep. 1, 1986 (In Japanese).
Takaragi et al., "A Practical and Fair Protocol for Signing Contracts", Jul. 8, 1988.

*Primary Examiner*—Thomas H. Tarcza
*Assistant Examiner*—Tod Swann
*Attorney, Agent, or Firm*—Fay, Sharpe, Beall, Fagan, Minnich & McKee

[57] ABSTRACT

A mediation can be requested to a computer connected to a communications network when transacting parties A and B effect an electronic transaction and trouble takes place during the transaction. The transaction is effected by a procedure where the transacting party B transmits its preliminary digital signature to the transacting party A. When the transacting party B agrees with the contract document M transacting part A has submitted, the transacting parties A and B exchange their formal signature with each other. These signatures are obtained by coding data including a hash total h(M) obtained by transforming the contract docmument M, identifiers of the transacting parties A and B and a data identifier indicating whether the data are prepared for the preliminary on the formal signature by the public key cryptosystem using a secrete key for one of the transaction parties. When a trouble takes place, the mediation organization decodes the signatures submitted by the transacting parties as evidences by using a public key and checks as the basic of h(M) and the identifiers of the transacting parties whether the evidence data concern the same transaction or not. Finally, it decides the sort of the signatures based on the data identifiers and deduces a conclusion of the mediation.

9 Claims, 4 Drawing Sheets

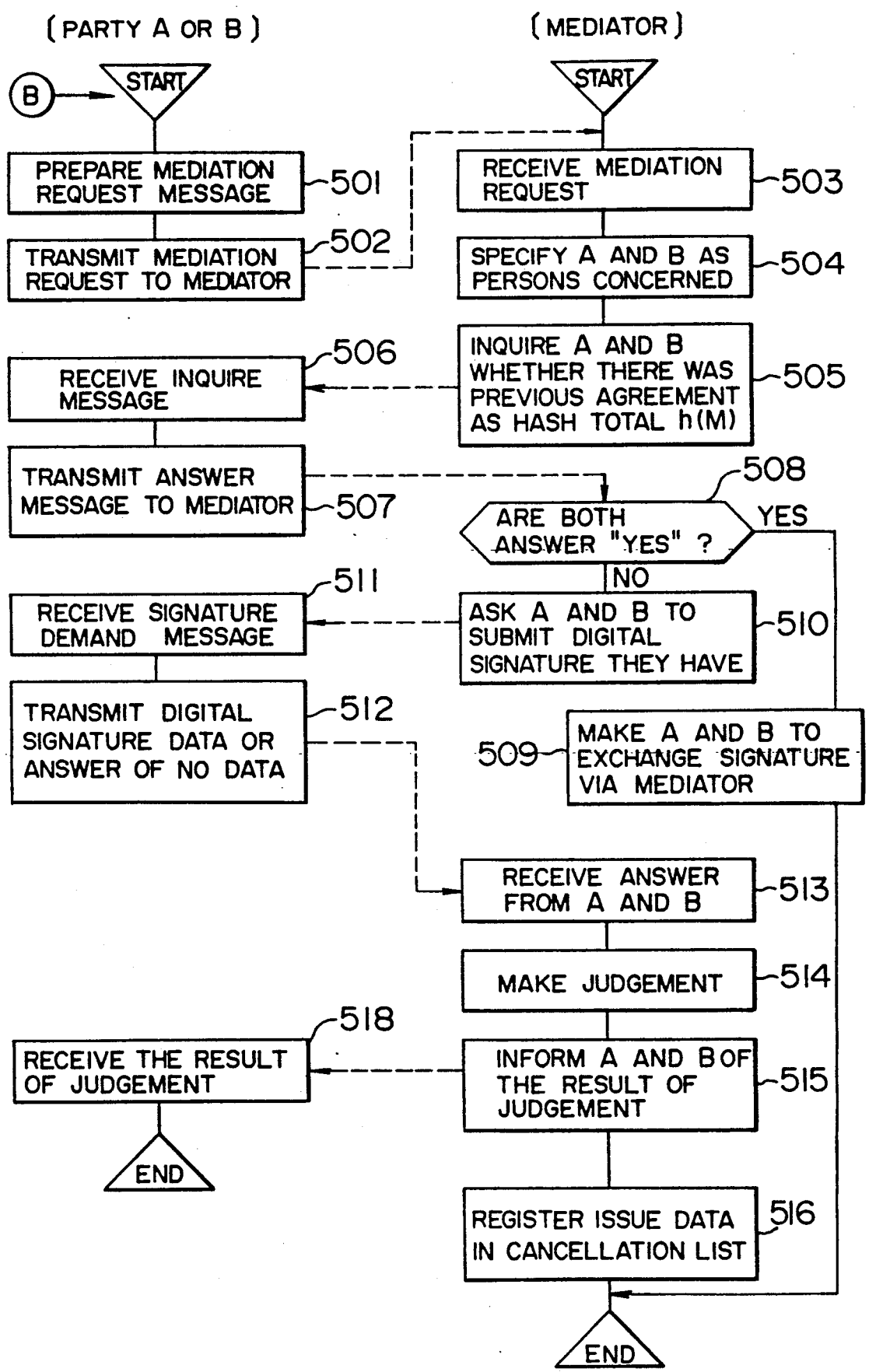

| CASE | A SUBMITS | | B SUBMITS | | JUDGEMENT |
|---|---|---|---|---|---|
| | S(B) | T(B) | S(A) | T(A) | |
| CASE 1: B CLAIMS TO HAVE HAD A PREVIOUS AGREEMENT TO MAKE CONTRACT WITH A, WHILE A CLAIMS NOT | X | — | X | X | NOT DECIDED |
| | — | — | — | O | A IS WRONG |
| | — | — | O | — | A IS WRONG |
| | O | — | X | X | B IS WRONG |
| CASE 2: A CLAIMS TO HAVE HAD A PREVIOUS AGREEMENT TO MAKE CONTRACT WITH B, WHILE B CLAIMS NOT | X | X | X | — | NOT DECIDED |
| | X | X | O | — | A IS WRONG |
| | — | O | — | — | B IS WRONG |
| | O | — | — | — | B IS WRONG |
| CASE 3: NEITHER A NOR B CLAIMS TO HAVE HAD A PREVIOUS AGREEMENT TO MAKE CONTRACT | X | X | X | X | NOT DECIDED |
| | X | X | — | O | A IS WRONG |
| | X | X | O | — | A IS WRONG |
| | — | O | X | X | B IS WRONG |
| | O | — | X | X | B IS WRONG |
| | — | O | O | — | BOTH ARE WRONG |
| | — | O | — | O | BOTH ARE WRONG |
| | O | — | — | O | BOTH ARE WRONG |
| | O | — | O | — | BOTH ARE WRONG |

141  142  143  144  145  146

METHOD FOR ELECTRONIC TRANSACTION WITH DIGITAL SIGNATURE

CROSS-REFERENCE TO RELATED APPLICATION

The present application is a continuation-in-part to a U.S. application Ser. No. 180,050 filed Apr. 11, 1988, now U.S. Pat. No. 4,885,777 which is a continuation of U.S. Ser. No. 897,861 filed Aug. 19, 1986 now abandaned, and assigned to the present assignee.

BACKGROUND OF THE INVENTION

1. Field of the Invention

The present invention relates to a method for electronic transaction and more in detail to a method for exchanging signatures, by which document data are transmitted to each other between two remote terminals through a communication network and users of the two terminals exchange digital signature data for an agreed document with each other.

2. Description of the Related Art

With the progress of the information oriented society the importance of electronic transaction increases, by which commercial contract documents are exchanged through an information network.

In the electronic transaction the digital signature applying a public-key cryptosystem is considered as useful as techniques for giving authenticate of transmitter, approver, etc. of a message in transmission and reception of a computer message.

Now, in the case where it is necessary to exchange digital signatures of two parties for contracts, etc. between the two parties, which are in an equal or competitive relation, since they are far away from each other through a communication network, it is necessary to prevent unfair practice such that one of them runs away with the signature of the other in a one-sided manner in the course of the exchange of the digital signatures.

For example, the parties of a contract (transactors) are assumed as A and B. In the case where a situation happens that although A has transmitted its digital signature indicating that it has approved formally a certain contract document, B does not send back its digital signature indicating that it has approved formally the contract document stated above, A, which has not the digital signature of B, cannot execute the contract state above. On the contrary, since B has already procured the digital signature of A, B is in an advantageous position, where B can make the contract effective to carry out it at its convenience by attaching the digital signature of B thereto.

In order to remove such an inconvenience, it is necessary to guarantee that when one of the parties sends its formal digital signature, the other sends back the formal digital signature thereof to the former. One of the methods fulfilling this requirement is to install a third organization (mediation organization) on the communication network, which can judge practices of the parties of the contract in an impartial position, which organization makes the two parties submit their digital signatures once thereto and sends the digital signature of A to B as well as the digital signature of B to A after having confirmed that the two signatures are proper. However, by this signature exchange method, by which a mediation organization intervenes in each of transactions, the load of the mediation organization is excessively heavy and therefore this method has a drawback that the time necessary for a transaction increases.

The communication protocol for the signature exchange is described in detail e.g. in (1) Luc Longpre, "The use of public key cryptography for signing checks", Proc. Crypto 82, Aug. 23–25, USA, 1982, pp 191–192 and (2) Takaragi et al., "Authentication Method for Electronic Contracts with IC Card Key Management", The Transaction of the Institute of Electrical Engineers of Japan C, Vol. 107-C, No. 1, Jan. 1987, pp 46–53.

In addition, in relation to the content described above a US patent application (U.S. Ser. No. 180050) has been filed by Takaragi, et al.

At first, the method by Luc Longpre will be explained. Now it is supposed that transacting parties A and B put their signatures on a contract C. At this time, they proceed the following procedure.

Step 1: B sends the digital signature $E_{PKA}$ ($D_{SKA}$ (-- Accept, C --)) of B indicating that it has made a temporal or preliminary agreement for the contract C to A.

Step 2: A sends the digital signature $E_{PKB}$ ($D_{SKA}$ (-- Sign, C --)) of A indicating that it has made a formal agreement for the contract C to B.

Step 3: B sends the digital signature $E_{PKA}$ ($D_{SKB}$ (-- Sign, C --)) of B indicating that it has made a formal agreement for the contract C to A.

Here (-- Accept, C --) indicates data indicating that the contract C is preliminarily accepted; $D_S$ (x) indicates data obtained by coding data x by a public-key cryptosystem using a secret key S; and $E_P$(x) indicates data obtained by decoding data x by the public-key cryptosystem using a public-key P. Further (-- Sing, C--) represents data indicating that the contract C is formally signed.

The literature described above by Luc Longpre suggests that in the case where some trouble takes place in the course of the signature exchange, e.g. if B doesn't send the formal signature of B to A in Step 3, A can force B into signing formally, showing the preliminary signature of B in a tribunal.

Luc Longpre indicates that an insufficient point of this method is that if A does not send the formal signature of A to B in Step 2, an unfair state takes place, where only B has sent the preliminary signature of B to A, which is a problem.

In order to solve this problem, according to Luc Longpre, it is conceivable to set a delay time, after the expiration of which the preliminary signature is cancelled. However, in this literature no study has been carried out in detail, e.g. on measures, which are to be taken when there are errors in the clock of either A or B. For this reason, Luc Longpre has concluded that this signature exchange method is not so excellent.

Now, the prior art method according to Takaragi will be explained.

Now A and B put their signatures to a communication message M. At this time, they proceed the following procedure.

Step 1: B prepares the temporal or preliminary signature $T(B)=E_B(c_1(M))$ of B (in the literature described above, called digital tally) for a communication message M, which is sent to A. (In the literature above, description is made by using a notation m in lieu of M and $W_B'$ in lieu of T(B).) Here, $c_1(M)$ represents the hash total of the communication message M obtained by using a first hash function, followed by data indicating the state of the relevant transaction such as the time, the sequential number, the name of the transaction, etc. However $c_1(M)$ does not satisfy the proper formality for validating the transaction. Further $E_B(X)$ indicates data obtained by coding data X by the public-key cryptosystem using the secret key of the transacting party B.

Step 2: The transacting party A sends the formal signature $S(A) = E_A(c_2(M))$ of A to the transacting party B. (In the literature described above a notation $W_A$ is used in lieu of $S(A)$.) Here, $c_2(M)$ represents the hash total of the communication message M obtained by using a second hash function, which is different from the first hash function described above, followed by data indicating the state of the relevant transaction such as the time, the sequential number, the name of the transaction, etc. and satisfies the proper formality for validating the transaction.

Step 3: The transacting party B sends the formal signature $S(B) = E_B(c_2(M))$ of B for the communication message to the transacting party A. (In the literature described above a notation $W_B$ is used in lieu of $S(B)$.) Here $c_2(M)$ is identical to $c_2(M)$ in Step 2 stated above.

The literature by Takaragi et al discloses the following items as a procedure at a trouble in the signature exchange stated above.

(1) In Step 2, in the case where A does not send the formal signature of A or it sends its false signature after having received the preliminary signature of B, the preliminary signature of B is cancelled by recording it in an cancellation list. However it is not judged which is improper, A or B.

(2) In Step 3, in the case where B does not send the formal signature of B or it sends its false signature after having received the formal signature of A, if the preliminary signature of B, which A submits, is in the cancellation list, it is judged that A is improper and if the preliminary signature of B, which A submits, is in the cancellation list, it is judged that B is improper.

Neither the method proposed by Luc Longpre nor that proposed by Takaragi et.al has any function to protect privacy of the transacting parties against the mediation organization, i.e. to realize to have the mediation at the occurrence of a trouble executed by the mediation organization without leaking the content of the contract document to the mediation organization. For example, by the method proposed by Luc Longpre the mediation organization can read out the content of Accept, i.e. the contract document M (=C) itself from the digital signature $D_{SKA}$ (-- Accept, C --) submitted to the mediation organization.

On the other hand, by the prior art method proposed by Takaragi et.al, no method is disclosed for confirming items necessary for the mediation without procuring the contract document M, i.e. that (i) the digital tally $E_B(c_1(M))$ and the formal digital signature $E_A(c_2(M))$, $E_B(c_2(M))$ correspond to each other, and (ii) these digital signatures relate to the transaction between the transacting parties A and B.

SUMMARY OF THE INVENTION

An object of the present invention is to provide a system for electronic transaction and a method therefor, by which the mediation organization intervenes only when a trouble takes place in the course of the digital signature exchange effected through a communication network.

Another object of the present invention is to provide a system for electronic transaction and a method therefor, by which the mediation can be executed at the occurrence of a trouble, while protecting the privacy of the transacting parties.

Still another object of the present invention is to provide a digital signature exchange system and a method therefor, by which the mediation organization can judge which transacting party is improper without knowing the content of the contract document on the basis of evidence data submitted by the transacting parties, when a trouble takes place in an electronic transaction.

In order to achieve the above objects, in the electronic transaction or the digital signature exchange system according to the present invention, in the case where a transacting party B agrees to a contract document M, which a transacting party A has submitted to the transacting party B through a communication network, the transacting party B prepares a data DATA 1 including a hash total h(M) of the contract document M, identifiers IDA and IDB of A and B, respectively, and first attribute information (in the present application, represented by a notation TEMP) indicating that these data are temporal or preliminary digital signature data, and sends a preliminary digital signature T(B) obtained by coding DATA 1 by the publickey cryptosystem using the secret key of the transacting party B to A.

Here, the transmission of the preliminary digital signature T(B) means that the own party (B) promises to send its formal digital signature S(B), when the other party (A), which has received T(B), has transmitted its formal digital signature S(A).

The transacting party A, which has received the preliminary digital signature T(B), can reproduce DATA 1 by decoding the received data by using the public key of the transacting party B and since the notation TEMP is attached thereto, the transacting party A can know that these received data indicate a preliminary signature. Further, it is possible to judge whether this digital signature concerns the contract document stated above or not, by confirming that the hash total h(M) of the contract document M, which the transacting party A itself has transmitted, is in accordance with the hash total h(M) included in the DATA 1.

According to this invention, the transacting party A, which has received the preliminary digital signature, prepares a data DATA 2 including h(M), IDA, IDB, and second attribute information indicating that the data represents the formal digital signature of B (which is represented by a notation SIGN in the present application) and sends the formal digital signature S(A) of A obtained by coding the data DATA 2 by the public-key cryptosystem using the secret key of A to B. The transacting party B can reproduce DATA 2 by decoding the received data S(A) by using the public key of A and know that these received data represent the formal digital signature of A because the reproduced data DATA 2 includes the second attribute information SIGN. Then the transacting party B sends back the formal digital signature S(B) of B obtained by coding DATA 2, which is identical to the received data, by the public-key cryptosystem using the secret key of B to A. These digital signatures are stored (memorized) together with the contract document M in the terminals of both the transacting parties.

According to this invention, when a transaction is terminated without trouble, the transacting parties A and B have the formal digital signatures S(B) and S(A), respectively, which are issued by the mutually other parties.

Since each of the digital signatures S(A) and S(B) is obtained by enciphering the data DATA 2 by using the secret key, which only the transacting party itself knows, and DATA 2 include the identifiers IDA, IDB of the transacting parties and the hash total h(M) of the contract document M, neither of the transacting parties can deny that it has approved formally the transaction, if the other party submits its digital signature as an evidence.

In the case where a trouble takes place in the electronic transaction described above, either one of the transacting party demands a mediation to the mediation organization. The mediation demander submits data, which it can submit among following data;

(i) hash total h(M) of the contract document M;
(ii) intention data indicating whether the transacting party itself have had a previous agreement to make the transaction or contract represented by h(M); and
(iii) preliminary digital signature T(B) (or T(A)) and formal digital signature S(B) or S(A) sent by the other party of the transaction.

The mediation organization demands it to the other transacting party to submit data, which it can submit, among (i) to (iii) described above and deduces a conclusion according to a predetermined judgement procedure on the basis of the mutual relation of the data submitted by the two transacting parties.

According to the present invention, the mediation organization can confirm that the relevant transaction is a transaction between A and B by the fact that the plain text data of the submitted digital signatures, i.e. the data obtained by decoding the relevant signatures, includes the identifiers IDA and IDB of the two transacting parties A and B. Further, the relevant plain text data of the signatures includes the hash total h(M) of the contract document M, but it does not include the contract document M itself. Consequently, the content itself of the contract document M is not known by the mediation organization and therefore, the privacy of the two transacting parties is protected.

Since the notation TEMP is included in the plain texts of T(A) and T(B), the mediation organization can confirm that the relevant signature is a preliminary signature. Similarly, since the notation SIGN is included in the plain texts of S(A) and S(B), the mediation organization can confirm that the relevant signature is formal signature.

If in a mediation procedure both the data to assert the relevant previous agreement inputted by A and B are "a previous agreement is present", the mediation organization C makes them send their digital signatures S(A) and S(B) to B and A, respectively, through the mediation organization C.

If either one of the data to assert the relevant previous agreement inputted by A and B is "no previous agreement is present", the relevant input data are applied to the predetermined judgement procedure, which the mediation organization C holds, and judgement result messages are transmitted to the parties.

Thereafter one of S(A), S(B), T(A) and T(B), which is a point of contention in the trouble, is recorded in the cancellation list held by the mediation organization C.

In the case where a third party intends to use maliciously a digital signature, which has been once cancelled by the mediation organization at the trouble, when somebody, who is aware of the malicious use, demands a mediation to the mediation organization, it is possible to judge the validity of the digital signatures by referring to the cancellation list described above.

The foregoing and objects, advantages, manner of operation and novel features of the present invention will be understood from the following detailed description when read in connection with the accompanying drawings.

BRIEF DESCRIPTION OF THE DRAWINGS

FIG. 3 is a flow chart indicating the procedure for a mediation operation effected between terminal devices of the transacting parties and a mediation terminal, when a trouble takes place in an electronic transaction; and FIG. 4 is a scheme showing the content of a table indicating a mediation rule, which the mediation terminal refers to.

DESCRIPTION OF THE PREFERRED EMBODIMENTS

Figure 1:
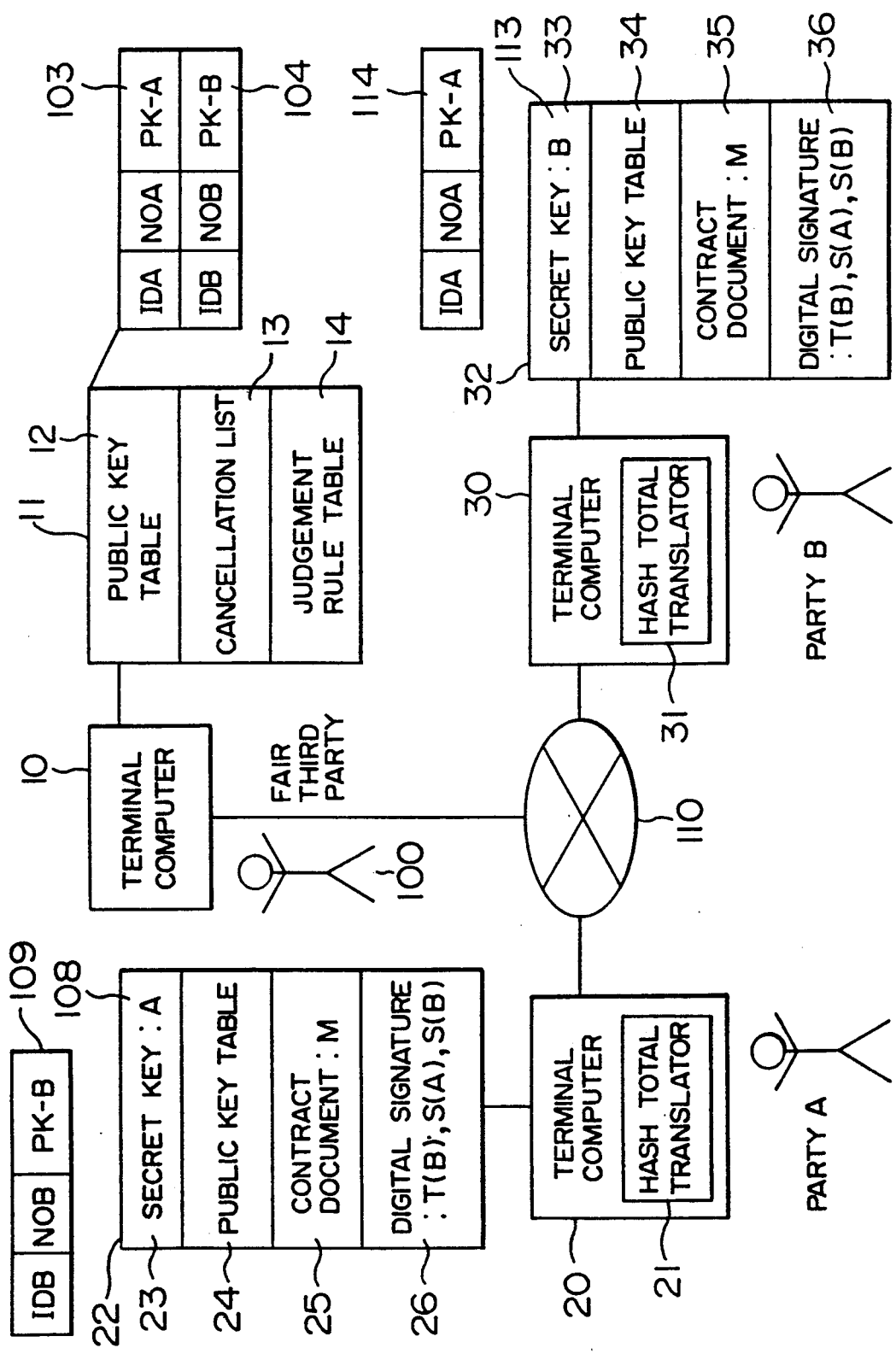
FIG. 1 is a scheme indicating an network system for executing the electronic transaction according to this invention.

FIG. 1 shows the whole construction of an electronic transaction system according to the present invention.

A terminal computer 20, which the transacting party a possesses, a terminal computer 30, which the transacting party B possesses, and a terminal computer 10, which the mediation organization 100 possesses are connected with each other through a communication network 110. Each of the computers is a work station having a usual communication function and provided with a keyboard, through which data and commands are inputted, a memory for storing the data and a display device for displaying the data. Further each of the terminal computers 20 and 30, which the transacting parties A and B possess, respectively, is provided with a transformation function (program) 21, 31 for transforming data of a contract document (text data) M into a hash total h(M) by using a predetermined hash function.

The memory 22 connected with the terminal computer 20 includes a region 23 for storing the secret key 108 of the transacting party A, a region 24 for storing the public key table, a region 25 for storing the contract document M, and a region 26 for storing a digital signature. The region 24 for storing the public key table stores a plurality of public key records, each of which includes an identifier IDX of a person, the address NOX of the terminal computer, and a public key PK-X. The public key table contains a record 109 including IDB, NOB and PK-B corresponding to the transacting party B.

The memory connected with the terminal computer 30 includes also, similarly to the memory 22, regions 33 to 36 for storing the secret key, the public key table, the contract document and the digital signature and the public key record 114 corresponding to the transacting party A is stored in the public key table.

The memory 11 connected with the terminal computer 10 of the mediation organization includes a public key table region 12, a cancellation list region 13, and a judgement rule table region, which is described later referring to FIG. 4. The public key table stores public key records of a plurality of members subscribed for the electronic transaction system.

Figure 2:
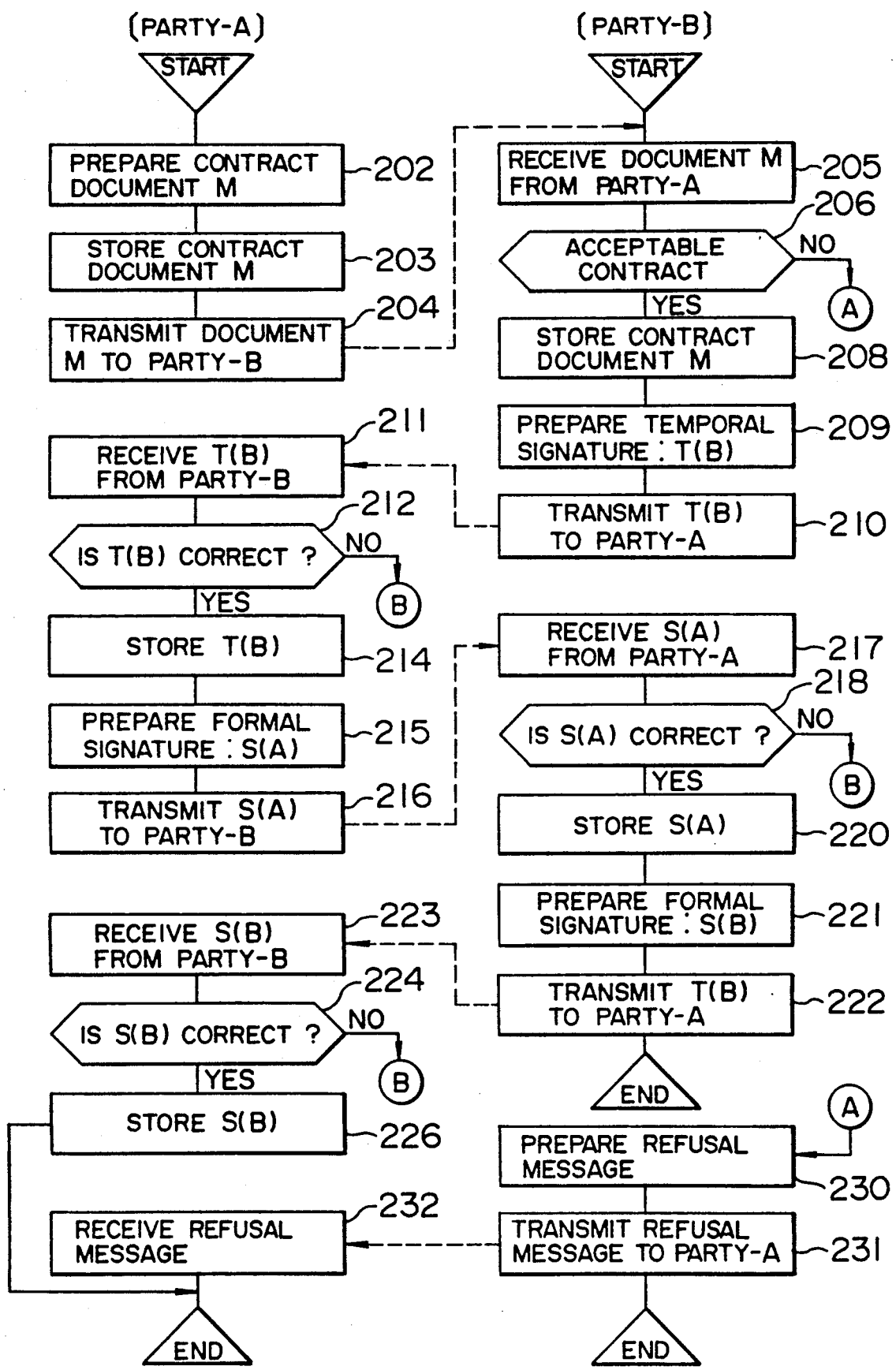
FIG. 2 is a flow chart indicating the procedure of the electronic transaction according to this invention effected between a terminal device of a transacting party A and a terminal device of a transacting party B.

FIG. 2 shows a flow chart indicating the operations of the terminal computers 20 and 30, in the case where the transacting parties A and B effect a transaction concerning the contract document M.

At first, the transacting party A operates the terminal 20 to prepare the contract document M (Step 202). Then, after this contract document M has been stored in the memory region 25 (Step 203), a communication line is established between the terminal 30 of the transacting party B and the terminal 20 and a message including the contract document M stated above is transmitted to the terminal 30 (Step 204).

When the terminal 30 receives the contract document data M from the transacting party A (Step 205), they are displayed on the displaying screen and the terminal 30 waits for an input indicating whether the transacting party B agrees with the content of the contract document stated above or not (Step 206). If the transacting party B inputs "NO" concerning the content of the contract document, the terminal 30 prepares a refusal message indicating that the transacting party B refuses the transaction concerning the contract document M (Step 230) and transmits it to the terminal 20 of the transacting party A (Step 231). When the terminal 20 receives the refusal message (Step 232), the procedure of the electronic transaction is terminated.

When the transacting party B inputs "YES" for the content of the contract document M, after the terminal 30 has recorded the contract document M in the memory region 34 (Step 208), it prepares the temporal or preliminary signature T(B) (Step 209), as follows;

$$T(B) = E_B(TEMP \| h(M) \| IDA \| IDB)$$

where $E_B(X)$ indicates data obtained by coding the data X by the public key cryptosystem, using the secret key 113 of the transacting party B. In this case, the data X are a combination (DATA 1) of an attribute notation TEMP indicating that the coded data is the preliminary signature, the hash total h(M) obtained by transforming the contract document M by using a predetermined hash function, the identifier IDA of the transacting party A and the identifier IDB of the transacting party B. The public key cryptography and the hash function are described in detail e.g. in "Modern Cryptology" by Ikeno and Koyama, The Transactions of The Institute of Electronics and Communication Engineers of Japan, published on September January, 1986, Chapter 6 (RSA) Public Key Cryptography) and Chapter 12 (Digital Signature).

After the terminal 30 has stored the original data DATA 1 of the digital signature T(B) stated above in a work area of the memory 32, a message including T(B) is transmitted to the terminal 20 of the transacting party A (Step 210).

When the terminal 20 receives T(B) from the transacting party B (Step 211), it judges whether T(B) is proper or not (Step 212). This judgement is effected by decoding the received data T(B) by the public key cryptosystem using the public key (PK-B) 109 corresponding to the identifier IDB of the transacting party B read out from the public key table region 24 and by ascertaining whether the decoding result DATA $1 = D_B(T(B))$ is in accordance with TEMP $\| h(M) \| IDA \| IDB$ formed by the own terminal or not. If the judgement result is "NO", the terminal proceeds to the mediation operation stated later, referring to FIG. 3. On the contrary, if the judgement result is "YES", after the preliminary digital signature T(B) received from the transacting party B has been stored as evidence data in the memory region 26 (Step 214), the formal digital signature S(A) by the transacting party A, expressed by the following Equation, is prepared (Step 215);

$$S(A) = E_A(SIGN \| h(M) \| IDA \| IDB)$$

where $E_A(X)$ indicates data obtained by encoding the data X by the public key cryptosystem, using the secret key 108 of the transacting party A and the notation SIGN is an attribute notation indicating that the enciphered data represent the formal signature. The terminal 20 transmits a message including the formal signature S(A) stated above to the terminal 30 of the transacting party B (Step 216).

When the terminal 30 receives the message stated above (Step 217), it decodes the received message by the public key cryptosystem using the public key PK-A 114 corresponding to the identifier IDA of the transacting party A read out from the public key table region 34 and judges whether the deciphering result DATA $2 = D_A(S(A))$ is in accordance with SIGN $\| h(M) \| IDA \| IDB$ formed by the own terminal or not (Step 218). Here the hash total h(M) is obtained by transforming the contract document M stored in the memory region 35 by a hash translator 31 or it is h(M) used in DATA 1, when the preliminary signature T(B) is prepared in Step 209.

In the case where the judgement result 218 is "disaccord", i.e. "NO", the terminal 30 quits this flow chart and proceeds to the mediation operation flow chart described later. If the judgement result 218 is "YES", the received data S(A) from the transacting party A is recorded in the memory region 36 as the formal digital signature (Step 220), and prepares the formal signature S(B) expressed by the following Equation which is to be transmitted to the transacting party A (Step 221);

$$S(B) = E_B(SIGN \| h(M) \| IDA \| IDB)$$

where $E_B(X)$ represents data obtained by coding the data X by the public key cryptosystem using the secret key 113 of the transacting party B. The terminal 30 transmits a message including S(B) stated above to the terminal 20 of the transacting party A 20 (Step 222) and this electronic transaction is terminated.

When the terminal 20 receives the message including S(B) stated above (Step 223), it decodes S(B) by the public key cryptosystem using the public key (PK-B) 109 corresponding to the identifier IDB of the transacting party B and judges whether the decoding result DATA $2 = D_B(S(B))$ is in accordance with SIGN $\| h(M) \| IDA \| IDB$ prepared by the own terminal or not (Step 224).

In the case where this judgement result is "accordance", i.e. "YES", S(B) is recorded in the memory region 26 as the formal digital signature from the transacting party B (Step 226) and the electronic transaction is terminated. In the case where the judgement result is "NO", the terminal proceeds to the mediation operation described later, referring to FIG. 3.

Each of the terminals proceeds to the mediation operation indicated in FIG. 3 also in the case where a message including a preliminary signature or a formal signature satisfying a predetermined formality is received from another terminal not through the procedure described above of the contract document (M), the preliminary signature T and the formal signature S.

FIG. 3 shows the flow chart indicating the mediation operation effected between the terminal computer 20 or 30, where a trouble takes place in the electronic transaction, and the terminal computer of the mediation organization.

When a trouble takes place in the course of the electronic transaction, the terminal 20 or 30 of the transacting party A or B starts a mediation program and at first prepares a message for requesting a mediation (Step 501). The message described above for requesting the mediation includes the hash total h,(M) for specifying the contract document M and the identifiers IDA and IDB for specifying the transacting parties. The message described above for requesting the mediation is transmitted to the terminal computer of the mediation organization in the form, where an address NOA or NOB indicating the terminal of the transmitter is added (Step 502).

When the message described above for requesting the mediation is received (Step 503), the terminal 10 of the mediation organization specifies the parties A and B as well as the terminal addresses NOA and NOB, which the parties A and B possess, referring to the public key table 12, on the basis of the parties' indentifiers IDA and IDB (Step 504).

Next the terminal 10 of the mediation organization prepares a message asking whether there is any previous agreement concerning the transaction specified by the hash total h(M) between the transacting parties A and B and transmits it to the terminals 20 and 30 (Step 505).

When the terminals 20 and 30 receive the asking message from the mediation terminal 10, they display the asking content on the displaying screens and demand answers to the transacting parties A or B (Step 506). When each of the transacting parties A and B inputs an answer indicating "a previous agreement is present" or "no previous agreement is present", each of the terminals 20 and 30 transmits the relevant answer message to the terminal 10 of the mediation organization (Step 507).

When the terminal 10 receives the answer messages from the terminals 20 and 30, it judges whether the answers of both of the transacting parties A and B are "a previous agreement is present" or not (Step 508). If both the answers are "a previous agreement is present", the terminal proceeds to Step 509 and makes the transacting parties A and B exchange their formal signature S(A) and S(B) with each other through the mediation organization. That is, the terminal 10 of the mediation organization issues demands to transmit formal digital signatures S(A) and S(B) to the terminals 20 and 30, respectively, and when it receives S(A) and S(B) from the terminals 20 and 30, it decodes them, using the public keys corresponding to the transacting parties A and B. If both of the decoded data include the notations SIGN indicating that they are formal signatures and they are in accordance with each other, the terminal 10 of the mediation organization transmits the signatures S(A) and S(B) to the terminals 30 and 20, respectively. When the operation of exchanging the formal signatures through the intermediation is completed, the terminal 10 of the mediation organization terminates the mediation operation.

On the other hand, in the judgement step 508, in the case where either one of the answers of the transacting parties A and B is "no previous agreement is present", the terminal 10 of the mediation organization prepares a message for asking the transacting parties A and B to demand "to submit the digital signature of the other party as to a contract represented by h(M), which it has already received" and transmit the demand to the terminals 20 and 30 (Step 510).

When the terminals 20 and 30 receive the submission demand message from the terminal 10 of the mediation organization (Step 511), they prepare messages including digital signatures, which they have, corresponding to this demand and transmit them to the terminal 10 of the mediation organization (Step 512). If one of them has no digital signature which is to be transmitted, it transmits a message informing the terminal 10 of the mediation organization thereof.

When the terminal 10 of the mediation organization receives answer messages from both the transacting parties A and B (Step 513), it effects a judgement operation in Step 514, referring to the cancellation list 13 and the judgement rule table 14 indicated in FIG. 4, as follows.

That is, the terminal 10 of the mediation organization refers at first to the cancellation list and if data, which have been already registered in the cancellation list, are found in the signature data received from the transacting parties A and B, it informs both the parties A and B thereof (Step 515). If no received signature data are found in the cancellation list, the terminal 10 of the mediation organization decodes the signature data submitted by the transacting parties A and B by using the public keys 103 and 104, and examines the attribute notation (SIGN or TEMP), h(M), IDA and IDB. In this way, it effects the judgement according to the judgement rule indicated in FIG. 4, depending on a combination of the answers of the transacting parties A and B concerning the presence or absence of the previous agreement and a combination of evidences, which the transacting parties A and B have submitted.

In FIG. 4, a column 141 indicates combinations of the answers of the transacting parties A and B concerning the previous agreement; columns 142 and 143 states of S(B) and T(B), respectively, submitted by the transacting party A as evidences; columns 144 and 145 states of S(A) and T(A), respectively, submitted by the transacting party B as evidences; and a column 146 the result of the judgement. A mark "O" means "an evidence is submitted" and a mark "X" means "no evidence is submitted", and a mark "—" means "judgement is effected, regardless of whether the evidence has been submitted or not". For example, in CASE 1, where the transacting party B asserts that a previous agreement to make contract with A is present and the transacting party A asserts that no previous agreement is present, if the transacting party B submits the preliminary signature T(A) or the formal signature S(A), which the transacting party A has prepared, as an evidence, it is decided that "A is wrong". On the contrary, in the case where the transacting party a submits the formal signature S(B) of the transacting party B as an evidence, while the transacting party B cannot submit S(A) and T(A), it is decided that "B is wrong". CASE 2 is a case where the answers concerning the previous agreement are reversed with respect to those in CASE 1 and CASE 3 is a case where both the transacting parties A and B answer "no previous agreement is present". The signatures and the results of the mediation are indicated in the FIG. 4.

The mediation organization transmits a message indicating the result of the judgement to the terminals 20 and 30 of the transacting parties A and B, after having passed judgement according to the judgement rule described above (Step 515). Then, it registers the digital signature data, which were the point of the contention, in the cancellation list (Step 516) to terminate this mediation routine. When the terminals 20 and 30 receive the judgement message described above from the terminal 10 of the mediation organization, they display it on their display screens (Step 518) to terminate this mediation routine.

Although in the embodiment described above there was shown an example, where the transacting parties A and B effect an electronic transaction, using the terminals 20 and 30, respectively, the electronic transaction according to this invention can be effected between arbitrary terminals connected to the network 110. Further, although in the above embodiment the transacting party A transmitted the contract document M to the terminal 30 of the transacting party B in plain text as it is, in order to prevent theft of the data in the course of the communication, the data may be enciphered to be transmitted.

Still further, in addition to the attribute information of the signatures, the hash total and the identifiers of the transacting parties described above, other information, e.g. time data may be added to the plain text DATA 1 of the preliminary signatures T(A) as well as the plain text DATA 2 of the formal signatures S(A) and S(B).

Still further, although in the above embodiment all the data processing necessary for the electronic transaction was effected by means of terminal computers, a part of the data processing, e.g. the enciphering (coding) and deciphering (decoding) processing, may be effected in a separate unit such as an IC card so that the electronic transaction is effected by sharing the function with the terminal computers. Still further, the terminal computers may be so constructed that two terminals connected to a communication line display the same image so as to constitute work stations, each of which has an electronic dialogue function to prepare documents, while an operator is engaging in a dialog with the other by telephone, and in this way the digital signatures S(A) and S(B) may be exchanged for the contract docment M prepared by the transacting parties A and B in cooperation with each other.

Although in the above embodiment the system was so constructed that each of the terminals of the transacting parties is connected with the terminal of the mediation organization through the network so that the mediation procedure can be executed on-line through the terminals of the transacting parties and the mediation terminal at a trouble occurrence, the mediation terminal may be of stand-alone type, which receives, from the transacting parties, data necessary for the mediation recorded e.g. in a portable memory medium such as a floppy disk, by mail, and the result of the mediation is replied to each of the parties in written form.

Further, the electronic transaction according to this invention can be applied widely not only to a text document indicating a usual contract or a promise but also to communication data concerning a content requiring commitment of parties such as a bill requiring the endorsement of the other party of the communication, an application document requiring a receipt, materials of a conferncece or video data thereof, recorded data, etc.

Furthermore, it is strictly verified in K. Takaragi, R. Sasaki, "A practical and fair protocol for signing contract" Information Processing Society of Japan, ISO/SC20 Japanese National Member Body, Working Group WG 1.3, Kikai Shinko Kaikan, July 8, 1988 that the judgement rule indicated in FIG. 4 can remove all the contentions taking place between transacting parties A and B.

What we claim is:

1. A method for electronic transaction, by which a first transacting party A and a second transacting party B exchange their digital signatures concerning a contract document M through terminal devices connected through a communication line, the method including the steps of:

a step of transmitting said contract document M from one of a first terminal device operated by said first transacting party A to a second terminal device operated by the second transacting party B to the other; a step of transmitting to said first terminal device by said second transacting party B a preliminary digital signature obtained by coding first data including an identifier IDA of the first transacting party A, an identifier IDB of the second transacting party B, a data identifier indicating that the first data is the preliminary digital signature by the public key cryptosystem using the secret key of the second transacting party B from said second terminal device and a hash total h(M) obtained by transforming said contract document M by using said predetermined hash function;

a step of transmitting by said first transacting party A a formal digital signature obtained by coding second data including a hash total h(M) obtained by transforming said contract document M by using said predetermined hash function, transmitting an identifier IDA of the first transacting party A, an identifier IDB of the second transacting party B and a data identifier indicating that the second data is a formal digital signature by the public key cryptosystem using the secret key of the first transacting party A from said first terminal device to said second terminal device; and a step of transmitting by said second transacting party B a formal digital signature obtained by coding said second data by the public key cryptosystem using the secret key of the second transacting party B from said second terminal device to said first terminal device.

2. A method for electronic transaction according to claim 1, further comprising:

a step of decoding preliminary digital signature transmitted by said second terminal device in said second step by using the public key corresponding to the second transacting party B by means of said first terminal device; and a step of judging by means of said first terminal device whether the data obtained by said decoding includes the same hash total h(M) as that obtained by transforming said contract document M by using said predetermined hash function or not, said third step being executed after said step for judging.

3. A method for electronic transaction according to claim 1, wherein said second terminal device executes said second step, in the case where the second transacting party B inputs a signal indicating that it agrees with the content of the contract document M transmitted from said first terminal device in said first step.

4. A method for electronic transaction according to claim 1, further comprising:

a step of decoding said formal digital signature of said first transacting party A transmitted from said first terminal device in said third step by using the public key corresponding to said first transacting party A by means of said second terminal device; and a step of judging by means of said second terminal device whether the data obtained by said decoding are in accordance with said second data coded by said second terminal device in said third step or not, said fourth step being executed after said judging step.

5. A digital signature exchange method, by which two transacting parties exchange their digital signatures concerning a contract document M through terminal devices connected through a communication line, comprising:

a first step of transmitting by one of said transacting parties a preliminary digital signature obtained by coding first data including a hash total h(M) obtained by transforming said contract document M by using a predetermined hash function and a data identifier indicating that the first data is a preliminary digital signature by the public key cryptosystem using said secret key of said one transacting party from first one of said terminal devices operated by said one transacting party to second one of said terminal devices operated by the other of said transacting parties;

a second step of transmitting by said other transacting party a formal digital signature obtained by coding second data including said hash total h(M) and a data identifier indicating that the second data is a formal digital signature by the public key cryptosystem using the secret key of the other transacting party from said second terminal device to said first terminal device; and a third step of transmitting by said one transacting party a formal digital signature obtained by coding said second data by the public key cryptosystem using said secret key of said one transacting party from said first terminal device to said second terminal device.

6. A digital signature exchange method according to claim 5, wherein both said first data enciphered in said first step and said second data enciphered in said second and third steps include said identifiers of said two transacting parties.

7. An electronic transaction method, by which a plurality of transacting parties exchange their digital signatures concerning contract information M with each other through terminal devices connected through a communication network and in the case where a trouble takes place, they request a mediation to a mediation means connected to said communication network; comprising:

a first step of transmitting by a first transacting party first digital signature data indicating a preliminary agreement of said first transacting party concerning said contract information M from a first terminal device operated by said first transacting party to a second terminal device operated by a second transacting party;

a second step of examining said first digital signature data received from said first terminal device by means of a second terminal device;

a third step of transmitting second digital signature data indicating a formal agreement of said second transacting party concerning said contract information M from said second terminal device to said first terminal device;

a fourth step of examining said second digital signature data received from said second terminal device by means of said first terminal device;

a fifth step of transmitting third digital signature data indicating said formal agreement of said first transacting party concerning said contract information M from said first terminal device to said second terminal device; and a sixth step of examining said third digital signature data received from said first terminal device by means of said second terminal device, wherein said first, second and third digital signature data are obtained by coding data including a hash total h(M) obtained by transforming said contract information M by using the same hash function, said identifier of said second transacting party, said identifier of said second transacting party and a data identifier indicating that the data represent a preliminary signature or a formal signature by the public key cryptosystem using said first or second transacting party's secret key.

8. An electronic transaction method according to claim 7, further comprising:

a step of transmitting the digital signature data, which each of the terminal devices receives from the terminal of the other transacting party, from the first and the second terminal device to said mediation means, when a trouble takes place concerning the electronic transaction;

a step of examining by said mediation means the digital signature data, which said mediation means receives from said first and said second terminal device, in order to decide a result of the mediation according to a predetermined rule; and a step of transmitting a message indicating said result of the mediation from said mediation means to said first and the second terminal device.

9. A method for electronic transaction, by which a first transacting party A and a second transacting party B exchange their digital signatures concerning a contract document M through first and second terminal devices connected through a communication line, said first terminal device being operated by said first transacting party A, and said second terminal device being operated by the second transacting party B the method including the steps of:

a step of transmitting by said second transacting party B a preliminary digital signature obtained by coding first data including a hash total h(M) obtained by transforming said contract document M by using a predetermined hash function, an identifier IDA of the first transacting party A, an identifier IDB of the second transacting party B and a data identifier indicating that the first data is a preliminary digital signature by the public key cryptosystem using the secret key of the second transacting party B from said second terminal device to said first terminal device;

a step of transmitting by said first transacting party A a formal digital signature obtained by coding second data including a hash total h(M) obtained by transforming said contract document M by using said predetermined has function, and identifier IDA of the first transacting party A, and identifier IDB of the second transacting party B and a data identifier indicating that the second data is a formal digital signature by the public key cryptosystem using the secret key of the first transacting party A from said first terminal device to said second terminal device; and a step of transmitting by said second transacting party B a formal digital signature obtained by coding said data by the public key cryptosystem using the secret key of the second transacting party B from said second terminal device to said first terminal device.

* * * * *

UNITED STATES PATENT AND TRADEMARK OFFICE
CERTIFICATE OF CORRECTION

| | |
|---|---|
| PATENT NO. : | 5,018,196 |
| DATED : | May 21, 1991 |
| INVENTOR(S) : | Kazuo Takaragi, et al. |

It is certified that error appears in the above-identified patent and that said Letters Patent is hereby corrected as shown below:

Claim 9, column 15, line 3, delete "has" and insert therefor --hash--.

Signed and Sealed this

Twenty-second Day of September, 1992

Attest:

DOUGLAS B. COMER

Attesting Officer

Acting Commissioner of Patents and Trademarks